US010627499B2

United States Patent
Wang

(10) Patent No.: US 10,627,499 B2
(45) Date of Patent: Apr. 21, 2020

(54) METHODS AND APPARATUS UTILIZING DIGITAL SIGNAL PROCESSING OF ULTRA WIDE BAND RADAR SIGNALS FOR LIVING OBJECT DETECTION IN WIRELESS POWER TRANSFER APPLICATIONS

(71) Applicant: WiTricity Corporation, Watertown, MA (US)

(72) Inventor: Qi Wang, Stuttgart (DE)

(73) Assignee: WiTricity Corporation, Watertown, MA (US)

( * ) Notice: Subject to any disclaimer, the term of this patent is extended or adjusted under 35 U.S.C. 154(b) by 799 days.

(21) Appl. No.: 14/935,127

(22) Filed: Nov. 6, 2015

(65) Prior Publication Data

US 2016/0341821 A1 Nov. 24, 2016

Related U.S. Application Data

(60) Provisional application No. 62/165,443, filed on May 22, 2015.

(51) Int. Cl.
*G01S 13/02* (2006.01)
*G01S 13/58* (2006.01)
(Continued)

(52) U.S. Cl.
CPC .......... *G01S 13/0209* (2013.01); *B60L 53/12* (2019.02); *B60L 53/124* (2019.02); *B60L 53/30* (2019.02);
(Continued)

(58) Field of Classification Search
CPC .... G01S 13/0209; G01S 7/285; G01S 13/582; G01S 13/87; G01S 13/88; G01S 13/003;
(Continued)

(56) References Cited

U.S. PATENT DOCUMENTS 5,966,090 A * 10/1999 McEwan ............... A61B 5/0507
340/541
6,049,302 A * 4/2000 Hinckley, Jr. ......... G01S 13/003
342/101
(Continued)

FOREIGN PATENT DOCUMENTS

WO WO-2013147948 A2 * 10/2013 ............... G01S 7/03
WO WO-2014073990 A1 5/2014
WO WO-2014129182 A1 8/2014

OTHER PUBLICATIONS

European Office Action dated May 22, 2019 for corresponding EP Application No. 16723871.6 (4 pages).
(Continued)

*Primary Examiner* — Vladimir Magloire
*Assistant Examiner* — Nuzhat Pervin
(74) *Attorney, Agent, or Firm* — Knobbe, Martens, Olson & Bear, LLP

(57) ABSTRACT

An apparatus for detecting an object in a detection area of a wireless power transfer system is provided. The apparatus comprises a receiver configured to receive a plurality of radar signals from a radar transceiver. The apparatus comprises a processor configured to convert the plurality of radar signals to a plurality of digital radar signals. The processor is configured to bandpass filter the plurality of digital radar signals. The processor is configured to remove frequency content below a first threshold frequency common to at least two consecutive digital radar signals of the plurality of digital radar signals. The processor is configured to down-convert the plurality of digital radar signals into a plurality of complex digital baseband signals. The processor is configured to detect a range, a speed, and a direction of the object in the detection area based at least in part on the plurality of complex digital baseband signals.

28 Claims, 8 Drawing Sheets

(51) Int. Cl.
| | |
|---|---|
| *G01S 13/87* | (2006.01) |
| *G01S 7/285* | (2006.01) |
| *G01S 13/88* | (2006.01) |
| *G01S 7/288* | (2006.01) |
| *G01S 7/02* | (2006.01) |
| *B60L 53/12* | (2019.01) |
| *B60L 53/38* | (2019.01) |
| *B60L 53/60* | (2019.01) |
| *B60L 53/30* | (2019.01) |
| *B60L 53/124* | (2019.01) |
| *G01S 13/00* | (2006.01) |

(52) U.S. Cl.
CPC .............. *B60L 53/38* (2019.02); *B60L 53/60* (2019.02); *G01S 7/285* (2013.01); *G01S 13/582* (2013.01); *G01S 13/87* (2013.01); *G01S 13/88* (2013.01); *G01S 13/003* (2013.01); *G01S 2007/027* (2013.01); *G01S 2007/2886* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC ....... G01S 2007/027; G01S 2007/2886; G01S 13/536; G01S 7/022; G01S 13/931; G01S 7/36; G01S 7/354; B60L 11/182; B60L 11/1829; B60L 11/1838; B60L 2230/10; Y02T 10/7005; Y02T 10/7088; Y02T 90/121; Y02T 90/122; Y02T 90/125; Y02T 90/128; Y02T 90/14; Y02T 90/163; H02J 7/025; H02J 17/00; G01F 23/284; H04L 27/2647
USPC .......................................................... 342/21
See application file for complete search history.

(56) References Cited

U.S. PATENT DOCUMENTS

| | | | | |
|---|---|---|---|---|
| 6,081,822 A * | 6/2000 | Hillery | ................ | G06F 7/552 708/200 |
| 6,127,965 A * | 10/2000 | McDade | ............... | G01S 13/931 342/159 |
| 6,677,887 B2 * | 1/2004 | Harman | ................. | G01S 13/56 342/107 |
| 7,151,483 B2 * | 12/2006 | Dizaji | ...................... | G01S 7/36 342/201 |
| 7,466,261 B1 * | 12/2008 | Hoctor | ................... | G01S 7/288 342/118 |
| 7,668,505 B2 * | 2/2010 | Vacanti | ................. | H03H 9/462 375/350 |
| 7,750,841 B2 * | 7/2010 | Oswald | .................... | G01S 5/04 342/147 |
| 7,848,219 B1 * | 12/2010 | Zhang | .................... | G01S 7/021 370/208 |
| 8,194,788 B2 * | 6/2012 | Ye | .......................... | H03G 3/001 375/316 |
| 8,471,761 B1 * | 6/2013 | Hogg | ................... | G01S 13/536 342/114 |
| 8,576,197 B2 * | 11/2013 | Crandall | ................ | G06F 3/044 345/174 |
| 8,946,939 B2 * | 2/2015 | Drennen | ................. | H02J 7/025 307/104 |
| 9,145,110 B2 * | 9/2015 | Van Wiemeersch | ........................ | B60R 25/1004 |
| 9,470,783 B2 * | 10/2016 | Kim | ...................... | G01S 13/885 |
| 9,722,447 B2 * | 8/2017 | Partovi | .................. | H02J 5/005 |
| 2003/0002600 A1 * | 1/2003 | Twu | ..................... | H04L 27/2334 375/334 |
| 2004/0263378 A1 * | 12/2004 | Jossef | ..................... | G01S 7/022 342/20 |
| 2005/0069046 A1 * | 3/2005 | Tsui | .................... | H04L 27/2647 375/260 |
| 2007/0052576 A1 * | 3/2007 | Hausner | ................. | G01S 7/024 342/22 |
| 2007/0152874 A1 * | 7/2007 | Woodington | ......... | G01S 13/931 342/159 |
| 2008/0018523 A1 * | 1/2008 | Kelly, Jr. | ................ | G01S 13/48 342/70 |
| 2008/0316086 A1 * | 12/2008 | Hoctor | .................... | G01S 7/288 342/137 |
| 2009/0243913 A1 * | 10/2009 | Sekiguchi | .............. | G01S 7/354 342/109 |
| 2010/0097266 A1 * | 4/2010 | Johnson | ................. | G01S 7/285 342/195 |
| 2012/0230371 A1 * | 9/2012 | Chiskis | ................. | G01F 23/284 375/143 |
| 2012/0293445 A1 * | 11/2012 | Crandall | ............... | G06F 3/0418 345/174 |
| 2013/0177107 A1 * | 7/2013 | Seo | ........................ | H04B 1/001 375/340 |
| 2013/0249682 A1 * | 9/2013 | Van Wiemeersch | ......................... | B60R 25/1004 340/426.24 |
| 2014/0105256 A1 * | 4/2014 | Hanevich | ............... | H04B 1/001 375/219 |
| 2014/0159501 A1 * | 6/2014 | Kanno | .................... | H01F 38/14 307/104 |
| 2015/0198640 A1 * | 7/2015 | Lee | ........................ | H02J 7/025 320/108 |
| 2015/0355320 A1 * | 12/2015 | Kim | .................... | G01S 13/0209 342/21 |
| 2019/0086517 A1 * | 3/2019 | Puglia | ..................... | G01S 13/10 |

OTHER PUBLICATIONS

International Search Report and Written Opinion—PCT/US2016/030044—ISA/EPO—dated Jul. 22, 2016.

* cited by examiner

METHODS AND APPARATUS UTILIZING DIGITAL SIGNAL PROCESSING OF ULTRA WIDE BAND RADAR SIGNALS FOR LIVING OBJECT DETECTION IN WIRELESS POWER TRANSFER APPLICATIONS

CLAIM OF PRIORITY UNDER 35 U.S.C. § 119

The present application for patent claims priority to Provisional Application No. 62/165,443 entitled "METHODS AND APPARATUS UTILIZING DIGITAL SIGNAL PROCESSING OF ULTRA WIDE BAND RADAR SIGNALS FOR LIVING OBJECT DETECTION IN WIRELESS POWER TRANSFER APPLICATIONS" filed May 22, 2015, and assigned to the assignee hereof. Provisional Application No. 62/165,443 is hereby expressly incorporated by reference herein.

FIELD

The present disclosure relates generally to wireless power transfer, and more specifically to methods and apparatuses utilizing digital signal processing of ultra wide band (UWB) radar signals for living object detection in wireless power transfer applications.

BACKGROUND

Inductive power transfer to electrically chargeable vehicles at power levels of several kilowatts in both domestic and public parking zones may require special protective measures for safety of persons and equipment in proximity. Such measures may include detection of moving objects in the critical space of an inductive power transfer system. This may be particularly true for systems where the critical space (where electromagnetic field levels exceed certain critical levels) is open and accessible. Such measures may also include detection of living objects (e.g., humans, extremities of humans, or animals) to protect them from exposure to such strong electromagnetic fields.

However, conventional radar processing methods first down-convert RF signals to an IF frequency to obtain the complex radar signal in an analog domain, and then sample received radar signals at IF frequencies. Digital signal processing is applied to detect the target range, speed and moving direction. However this structure is complex and suffers from various analog impairments. Some radars sample the received radar signals at RF frequencies before down conversion, however, obtaining only the real component of the received radar signals. Therefore, such radar processing methods may determine only range or speed but not direction of detected objects. As such, methods and apparatuses utilizing digital signal processing of ultra wide band (UWB) radar signals for living object detection in wireless power transfer applications are desirable.

SUMMARY

Some implementations provide an apparatus for detecting an object in a detection area of a wireless power transfer system. The apparatus comprises a receiver configured to receive a plurality of radar signals from a radar transceiver. The apparatus comprises a processor configured to convert the plurality of radar signals to a plurality of digital radar signals. The processor is configured to band pass filter the plurality of digital radar signals. The processor is configured to remove frequency content below a first threshold frequency common to at least two consecutive digital radar signals of the plurality of digital radar signals. The processor is configured to down-convert the plurality of digital radar signals into a plurality of complex digital baseband signals. The processor is configured to detect a range, a speed, and a direction of the object in the detection area based at least in part on the plurality of complex digital baseband signals.

Some other implementations provide a method for detecting an object in a detection area of a wireless power transfer system. The method comprises receiving a plurality of radar signals from a radar transceiver. The method comprises converting the plurality of radar signals to a plurality of digital radar signals. The method comprises band pass filtering the plurality of digital radar signals. The method comprises removing frequency content below a first threshold frequency common to at least two consecutive digital radar signals of the plurality of digital radar signals. The method comprises down-converting the plurality of digital radar signals into a plurality of complex digital baseband signals. The method comprises detecting a range, a speed, and a direction of the object in the detection area based at least in part on the plurality of complex digital baseband signals.

Yet other implementations provide a non-transitory computer-readable medium comprising code that, when executed, causes an apparatus for detecting an object in a detection area of a wireless power transfer system to receive a plurality of radar signals from a radar transceiver. The code, when executed, further causes the apparatus to convert the plurality of radar signals to a plurality of digital radar signals. The code, when executed, further causes the apparatus to band pass filter the plurality of digital radar signals. The code, when executed, further causes the apparatus to remove frequency content below a first threshold frequency common to at least two consecutive digital radar signals of the plurality of digital radar signals. The code, when executed, further causes the apparatus to down-convert the plurality of digital radar signals into a plurality of complex digital baseband signals. The code, when executed, further causes the apparatus to detect a range, a speed, and a direction of the object in the detection area based at least in part on the plurality of complex digital baseband signals.

Yet other implementations provide an apparatus for detecting an object in a detection area of a wireless power transfer system. The apparatus comprises means for receiving a radar signal from a radar transceiver. The apparatus comprises means for converting the plurality of radar signals to a plurality of digital radar signals. The apparatus comprises means for band pass filtering the plurality of digital radar signals. The apparatus comprises means for removing frequency content below a first threshold frequency common to at least two consecutive digital radar signals of the plurality of digital radar signals. The apparatus comprises means for down-converting the plurality of digital radar signals into a plurality of complex digital baseband signals. The apparatus comprises means for detecting a range, a speed, and a direction of the object in the detection area based at least in part on the plurality of complex digital baseband signals.

DETAILED DESCRIPTION

The detailed description set forth below in connection with the appended drawings is intended as a description of implementations and is not intended to represent the only implementations in which the invention may be practiced. The term "exemplary" used throughout this description means "serving as an example, instance, or illustration," and should not necessarily be construed as preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
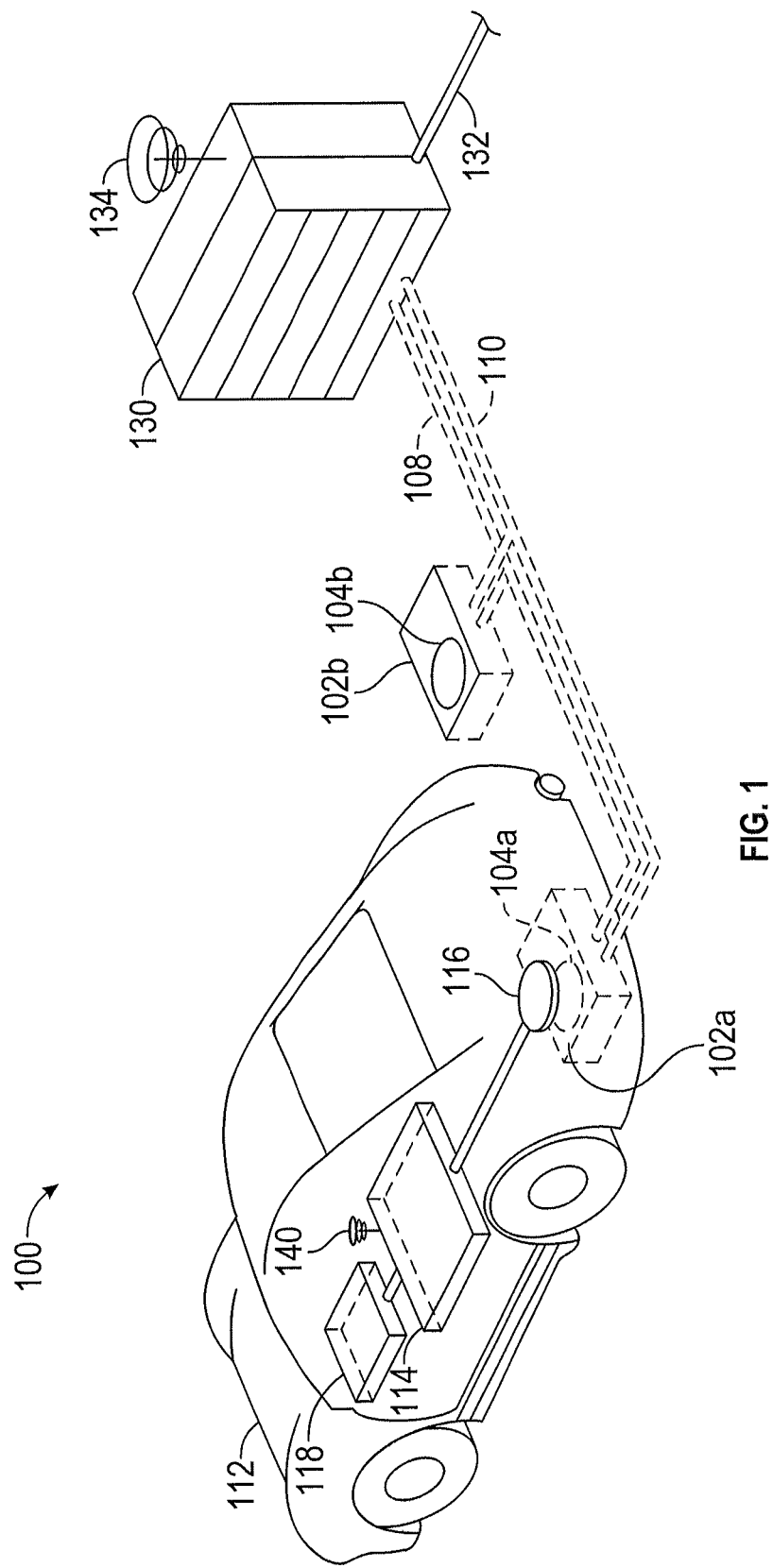
FIG. 1 illustrates a wireless power transfer system for charging an electric vehicle, in accordance with some implementations.

FIG. 1 is a diagram of a wireless power transfer system 100 for charging an electric vehicle, in accordance with some implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\frac{1}{2}\pi$ of a wavelength of the frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
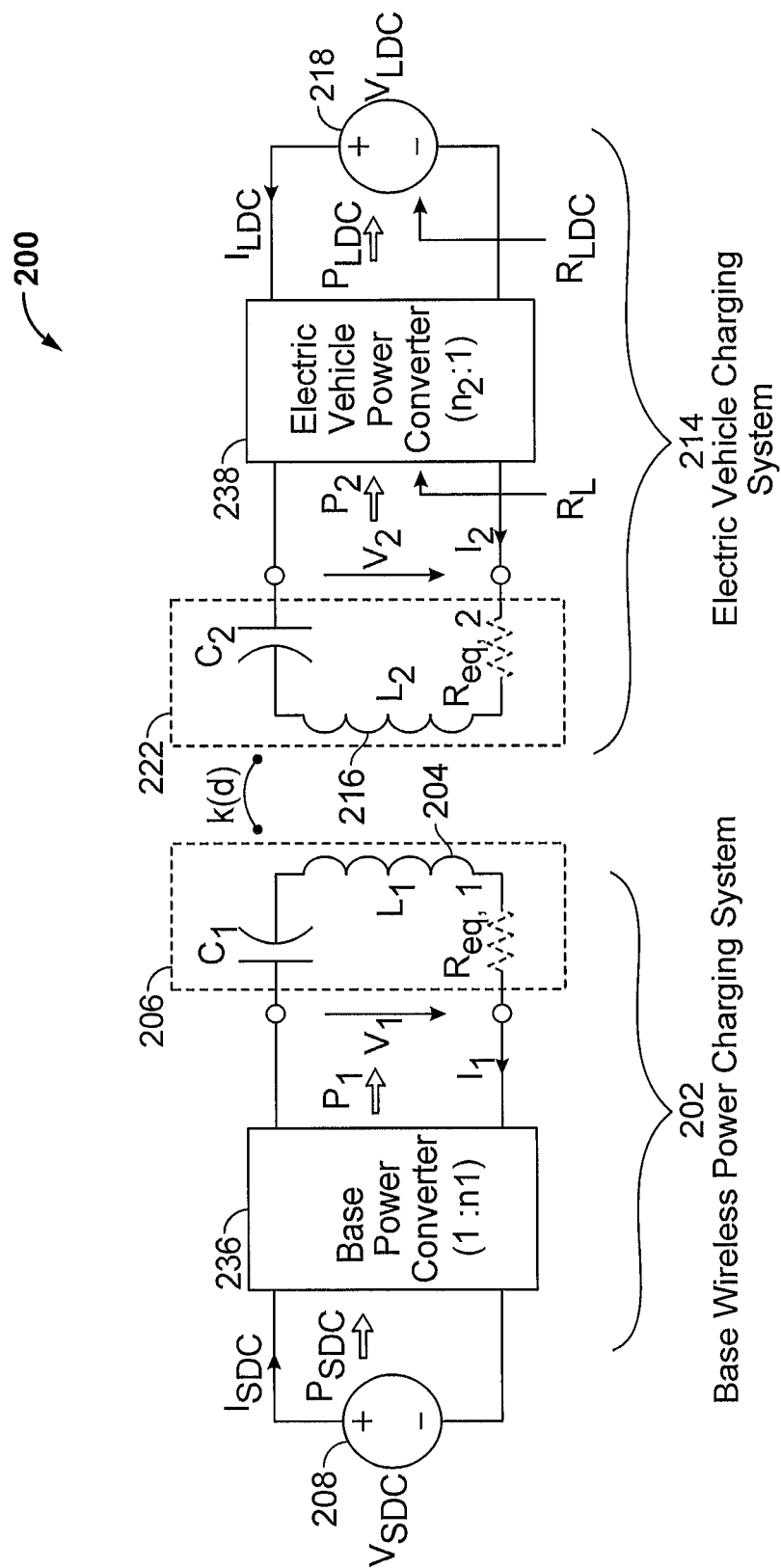
FIG. 2 is a schematic diagram of core components of a wireless power transfer system similar to that previously discussed in connection with FIG. 1, in accordance with some implementations.

FIG. 2 is a schematic diagram of core components of a wireless power transfer system 200 similar to that previously discussed in connection with FIG. 1, in accordance with some implementations. As shown in FIG. 2, the wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation "d." Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops," and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
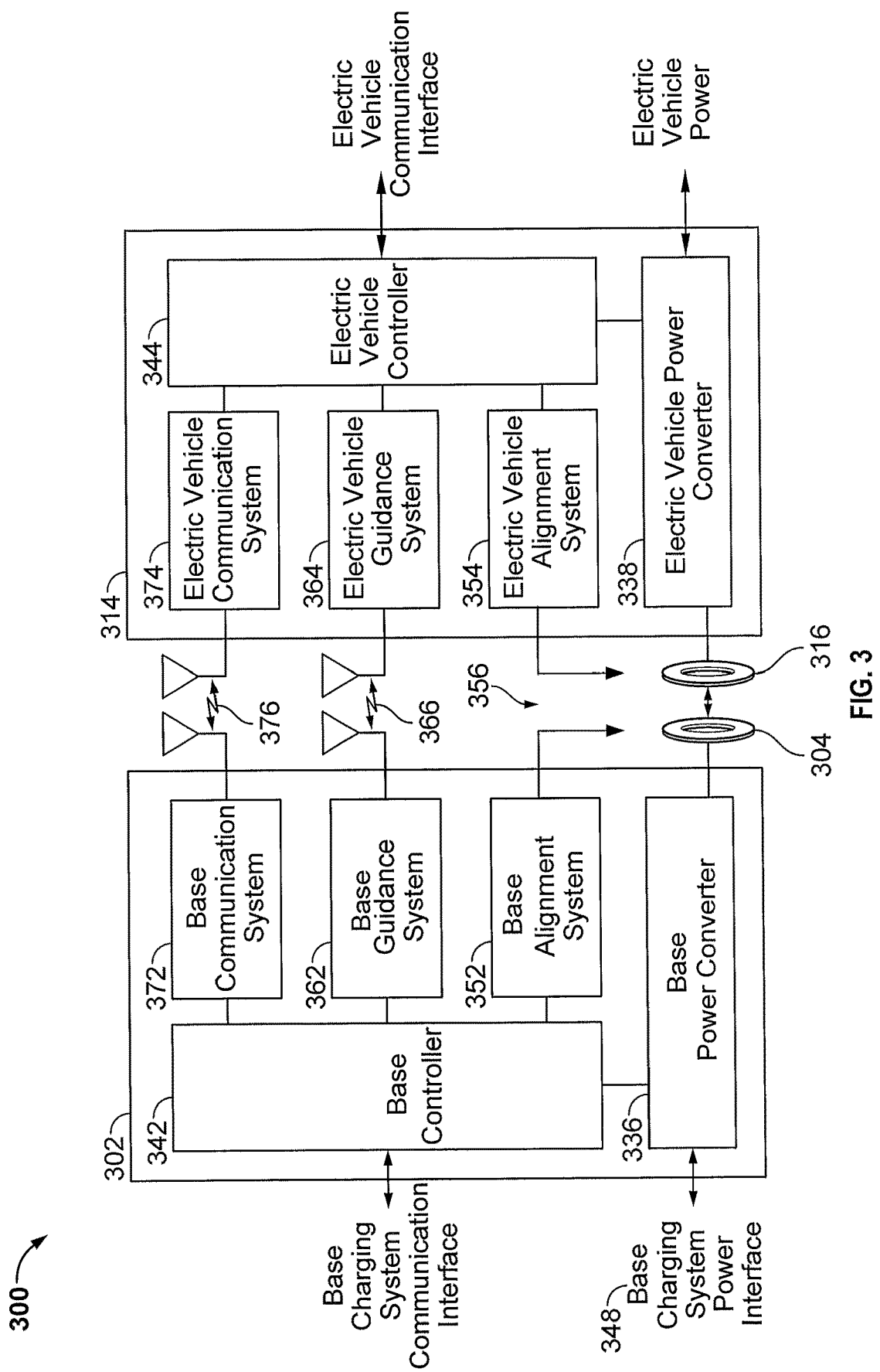
FIG. 3 is a functional block diagram showing core and ancillary components of the wireless power transfer system of FIG. 1.

FIG. 3 is a functional block diagram showing components of wireless power transfer system 300, which may be employed in wireless power transfer system 100 of FIG. 1 and/or that wireless power transfer system 200 of FIG. 2 may be part. The wireless power transfer system 300 illustrates a communication link 376, a guidance link 366, using for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 302, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

Figure 4:
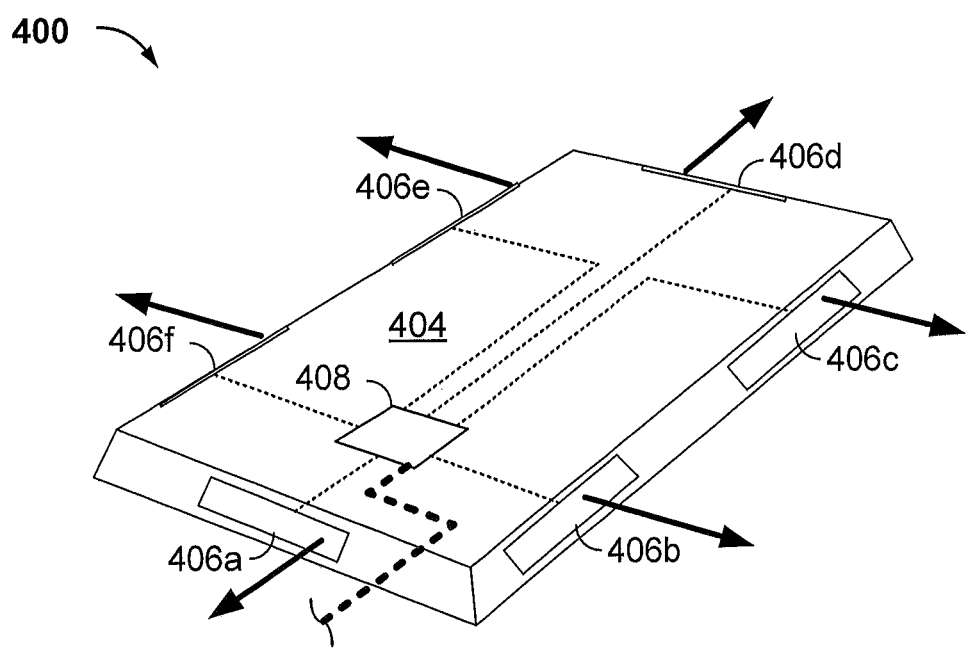
FIG. 4 is a schematic view of a living or moving object detection system integrated into a base pad of a wireless power transmitter, in accordance with some implementations.

Implementations described herein are directed to automatically detecting living and/or moving objects that may be located in a detection area around the inductive power transfer (IPT) base pad. FIG. 4 is a schematic view 400 of a living or moving object detection system integrated into a base pad 404 of a wireless power transmitter, in accordance with some implementations. As shown in FIG. 4, the base pad 404 may additionally include a plurality of radar transceivers 406a, 406b, 406c, 406d, 406e, and 406f (hereinafter collectively 406a-406f) each integrated into or mounted onto a side of the base pad 404. In some implementations, each radar transceiver, e.g., 406a may be configured to operate independently of the other radar transceivers, e.g., 406b-406f such that signals generated by the other radar transceivers, e.g., 406b-406f do not interfere with the operation of a particular radar transceiver, e.g., 406a. Because the radar transceivers 406a-406f are mounted on the sides of the base pad 404, living object protection (LOP) coverage on all sides or along an entire perimeter of the base pad 404 may be provided. In some implementations, the printed circuit boards (PCBs) of each of the radar transceivers 406a-406f may be integrated substantially vertically or at a slightly tilted angle from vertical (e.g., substantially perpendicular to the plane of the surface on which the base pad 404 is located). This may allow for radar transceiver integration without enlarging the dimensions of the base pad 404. In some other implementations, the radar transceivers 406a-406f may be integrated just below a top surface of the base pad 404 such that the base pad 404 may be flush mounted into a surface. In some other implementations, the radar transceivers 406a-406f may be installed on a vehicle as either a vehicle-pad-integrated system or as a discrete system.

As shown in FIG. 4, the base pad 404 may additionally include a processor 408 connected to each of the radar transceivers 406a-406f, as depicted by the thin dashed lines. The processor 408 may be configured to receive radar data from the radar transceivers 406a-406f. The processor 408 may utilize raw radar data from one or more of the radar transceivers 406a-406f in isolation (e.g., considering raw radar data from only one radar transceiver, e.g., 406a) or in combination (e.g., considering raw radar data from multiple radar transceivers 406a-406f in some aggregate fashion), to determine a presence of a moving or living object within a detection region, area or zone. Accordingly, the processor 408 and the plurality of radar transceivers 406a-406f may provide a "virtual electronic fence" around the base pad 404 for detecting any living or moving object in the detection region. In some implementations, the processor 408 may be configured to provide raw or processed radar data to the rest of the wireless electric vehicle charging (WEVC) system (see FIGS. 1-3) and receive status information or other data from the WEVC system. For such purposes, the processor 408 may be in communication with other portions of the WEVC system via a communications link, depicted by the heavy dotted line, at least to communicate an object detection trigger to the WEVC system for shutting down charging or for reducing an amount of power that is wirelessly transmitted by the base pad 404.

Figure 5:
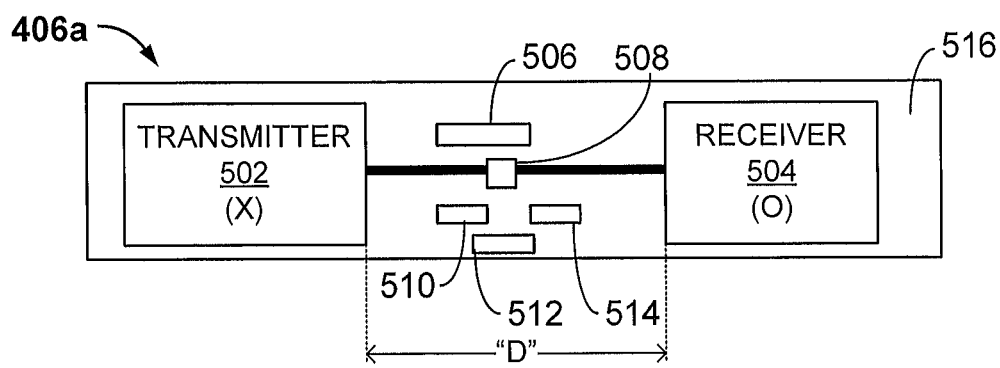
FIG. 5 is a functional block diagram of a radar transceiver as shown in FIG. 4, in accordance with some implementations.

The radar transceivers 406a-406f will now be discussed in more detail in connection with FIG. 5, using the radar transceiver 406a as a representative example of each of the plurality of radar transceivers 406a-406f. FIG. 5 is a functional block diagram of the radar transceiver 406a as shown in FIG. 4, in accordance with some implementations. The radar transceiver 406a may comprise a printed circuit board (PCB) 516. In some implementations, the PCB 516 may have a form factor of approximately 25 mm wide by 120 mm long, where the length may depend at least in part on a separation distance "D" between a transmitter 502 ("X") and a receiver 504 ("O") disposed on the PCB 516. However, the present application is not so limited and any dimensions may be utilized in accordance with a particular implementation. The separation distance "D" of the transmitter 502 from the receiver 504 may be based on a targeted or desired radar range and a desired or targeted width of the detection area (e.g., a desired detection area). For example, greater separation distance "D" leads to a wider detection area, but tends to shorten the usable range (e.g., the length of the detection area extending away from the radar transceiver). However, the overall behavior and performance of the radar transceiver 406a may depend on the type and characteristics of the transmitter 502 and the receiver 504. In some other implementations, a single transmitter/receiver may be contemplated at the expense of system sensitivity and potentially having to utilize a directional coupler circuit on the PCB 516.

The transmitter 502 and the receiver 504 may comprise ultra wide band (UWB) radar antennas operating in a frequency band of 1-10 GHz, although any type of UWB radar antenna operating in any associated frequency band (e.g., the 24 GHz ISM band, the 60 GHz ISM band, or the 77 GHz automotive band) may also be contemplated. In some implementations, the transmitter 502 and the receiver 504 may be configured to have omnidirectional transmit and receive patterns in the plane of operation.

The radar transceiver 406a may additionally comprise a processor 506, a UWB radar chip 508, interface circuitry 510, a connector 512, and a local power supply 514. The interface circuitry 510 may be configured to provide processing related to interfacing the radar transceiver 406a with the processor 408 of FIG. 4, for example. The UWB radar chip 508 may be configured to provide processing of raw radar data received from the receiver 504 or for transfer to the transmitter 502. The local power supply 514 may be configured to provide power to any of the chips or circuitry of the radar transceiver 406a. The connector 512 may be configured to provide the raw radar data from the radar transceiver 406a to the processor 408 previously described in connection with FIG. 4.

The radar transceiver 406a may additionally comprise the processor 506 configured to perform some level of local processing of raw radar data to be transmitted or that has been received by the transmitter 502 or the receiver 504, respectively. However, in at least some implementations, the processor 408 previously described in FIG. 4 may perform substantially all processing of the raw radar data received from the radar transceiver 406a.

The radar transceiver 406a may be configured to transmit radar signals via the transmitter 502, receive reflected radar signals via the receiver 504 (or via a receiver 504 of another radar transceiver 406b-406f), and provide raw radar data to at least one of the processor 506 of FIG. 5 and the processor 408 of FIG. 4. Ultimately, the processor 408 may be configured to determine, calculate, detect or provide information associated with an object detected in a detection area including but not limited to: a distance, a velocity, a direction to, or a size of the detected object. Upon accurate detection of an object, power to the base pad 404 may be discontinued or reduced to a lower level.

Figure 6:
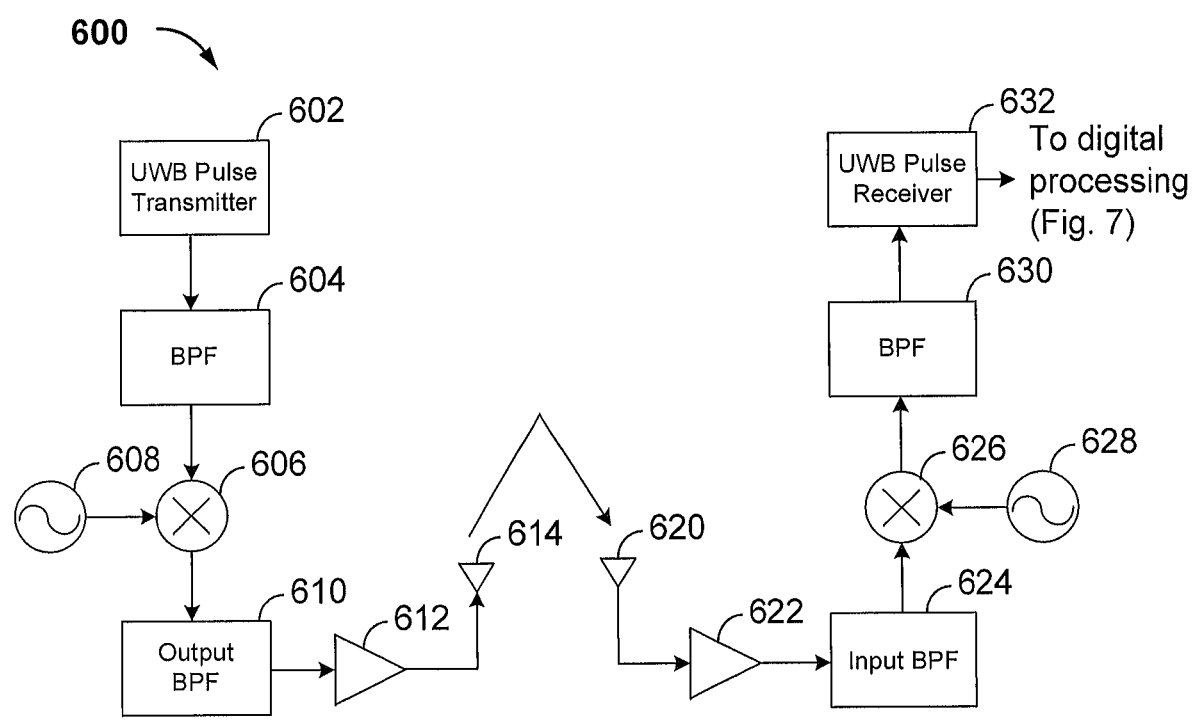
FIG. 6 is a block diagram of analog transmit and receive chains of a radar transceiver, in accordance with some implementations.

FIG. 6 is a block diagram 600 of analog transmit and receive chains of a radar transceiver, in accordance with some implementations. In FIG. 6, the transmit chain may comprise a UWB pulse transmitter 602, which may be configured to generate a pulse signal for subsequent transmission and utilization in detecting the presence of a living or moving object in a predetermined detection volume. The UWB pulse transmitter 602 may be connected to an analog band pass filter (BPF) 604, which may receive the pulse signal from the UWB pulse transmitter 602 and output a band pass filtered version of the pulse signal. The band pass filtered pulse signal is then input to a multiplier 606, which multiplies the signal with an oscillator signal provided to the multiplier 606 by a local oscillator 608. The multiplier 606 functions to up-convert the band pass filtered pulse signal to the UWB frequency range (e.g., 1-10 GHz). The up-converted pulse signal is output from the multiplier 606 and provided to an output band pass filter 610, which removes any harmonic side frequencies generated by the up-conversion process of the multiplier 606. The band pass filtered up-converted pulse signal is output from the output band pass filter 610 and provided to a power amplifier 612, which increases the power of the band pass filtered up-converted pulse signal (e.g., the UWB radar signal) for subsequent transmission by the transmit antenna 614. The transmit antenna 614 may correspond to the transmitter 502 previously described in connection with FIG. 5.

After transmission, the UWB radar signal may be received, either directly or via reflection off of surfaces in the environment, at a receive antenna 620. The receive antenna 620 may correspond to the receiver 504 previously described in connection with FIG. 5. The receive antenna 620 may provide the received UWB radar signal to a low noise amplifier 622, which increases the power of the received UWB radar signal, which may have been weakened by reflection in the environment. The amplified received UWB radar signal is output by the low noise amplifier 622 and provided to an input band pass filter 624 to remove any harmonic content not in the UWB frequency of interest. The band pass filtered amplified UWB radar signal is output from the input band pass filter 624 and provided to a multiplier 626, which down-converts the band pass filtered amplified UWB radar signal by multiplying it with another local oscillator 628 signal. In practice, the frequency of the up-converter local oscillator 608 signal and the frequency of the down-converter local oscillator 628 signal are substantially the same. The down-converted UWB signal is output from the multiplier 626 and provided to another band pass filter 630, which removes any harmonic side frequencies generated by the down-conversion process of the multiplier 626. The band pass filtered down-converted UWB signal is output from the band pass filter 630 and provided to a UWB pulse receiver 632.

The down-converted UWB signal provided to the UWB pulse receiver 632 is an analog baseband signal. Thus, at this point the down-converted UWB signal is sampled by a high speed analog-to-digital converter (not shown) and the baseband digital UWB signal is forwarded for further processing in the digital domain, as will be described in more detail in connection with FIG. 7.

Figure 7:
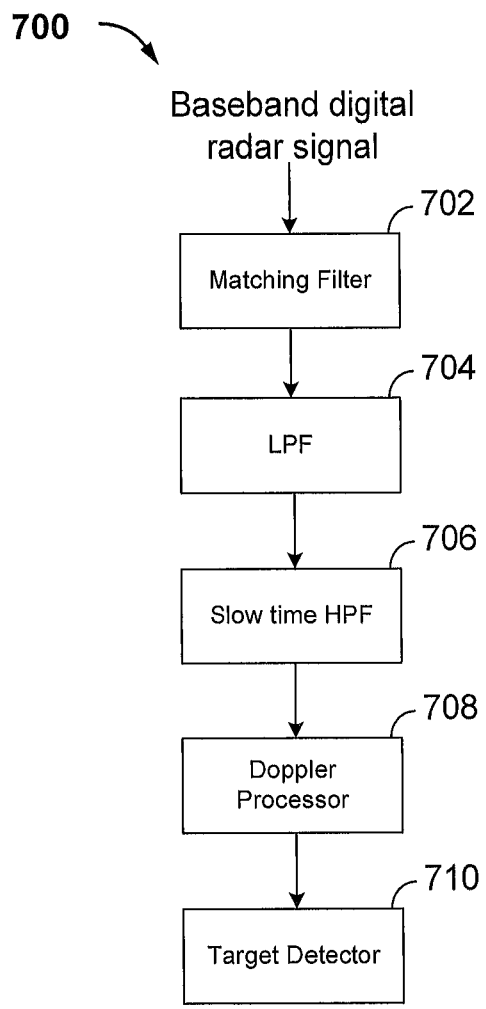
FIG. 7 is a block diagram of baseband digital processing in a receive chain of a radar transceiver, in accordance with some implementations.

FIG. 7 is a block diagram 700 of baseband digital processing in a receive chain of a radar transceiver, in accordance with some implementations. The baseband digital radar signal is provided to a matching filter 702, which provides digital domain filtering with a net effect of amplifying the baseband digital radar signal while simultaneously reducing noise in the signal. The match filtered baseband digital radar signal is output from the matching filter 702 and provided to a low pass filter 704, which removes or substantially attenuates frequency content above a desired threshold. The matched and low pass filtered baseband digital radar signal is output from the low pass filter 704 and input to a slow time high pass filter 706. The high pass filter 706 is considered "slow time" because it may remove frequency content below a desired threshold that is common to a plurality of consecutively received match filtered baseband digital radar signals. This has the net effect of ensuring that only fast-changing signals likely to be caused by living or moving objects remain after filtering, eliminating slow changing aberrations in the signal likely to have other causes such as, but not limited to, aging or heating of electrical components in the detection system. The output of the high pass filter 706 may then be provided to a Doppler processor 708, which may process the high pass filtered signal according to one or more algorithms that allow for at least the speed of an object to be determined if the object is present in the detection volume of the system. The output of the Doppler processor 708 may be provided to a target detector 710, which may process the output of the Doppler processor 708 and trigger a positive detection of an object based at least in part on the output of the Doppler processor 708 satisfying some criteria. Thus, in the system previously described in connection with FIGS. 6 and 7, digital processing occurs after down-conversion to baseband. Some drawbacks of this system are that the structure is very complex, and that the system suffers from various analog impairments.

Figure 8:
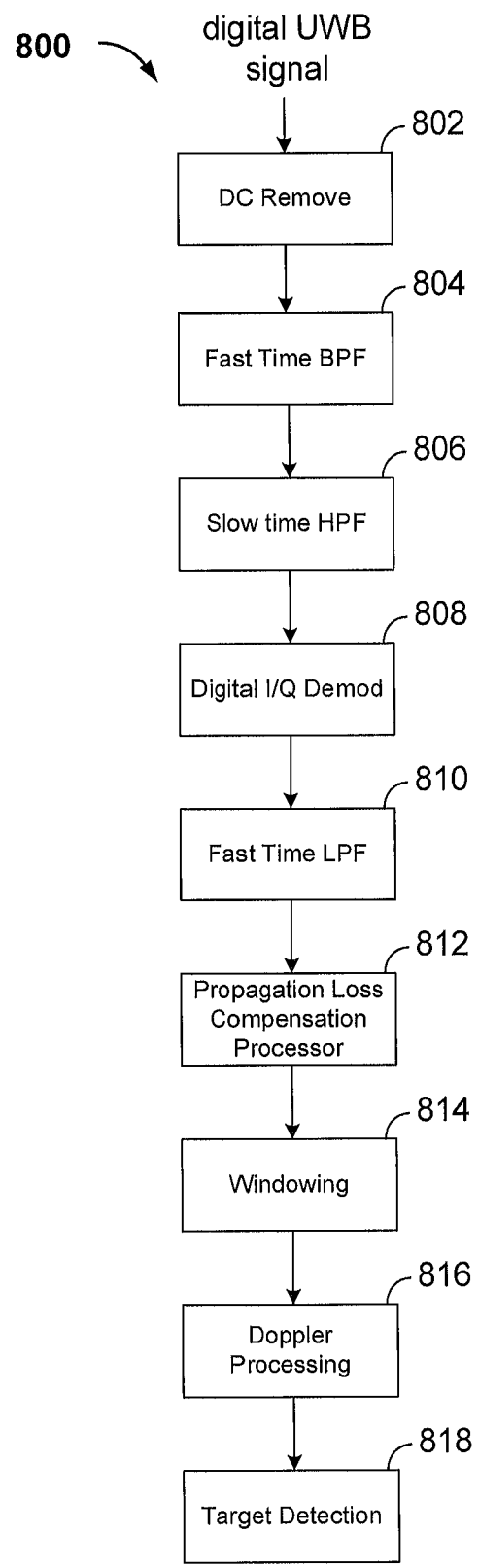
FIG. 8 is a block diagram of digital processing performed at radio frequency, before down-conversion, in a receive chain of a radar transceiver, in accordance with some implementations.

FIG. 8 is a block diagram 800 of digital processing performed at UWB frequency, before down-conversion, in a receive chain of a radar transceiver, in accordance with some implementations. In FIG. 8, the received UWB radar signal (which is an analog signal) is converted to a digital UWB signal utilizing a high speed analog-to-digital converter (not shown). A DC component removal operation is performed on the digital UWB signal at block 802, which has a net effect of shifting the digital UWB signal such that no DC component is present in the filtered signal and potentially improving dynamic range of the receiver. The output of block 802 may be provided to the input of a fast time band pass filter 804, which may have the net effect of passing only components of the digital UWB signal that are within a predetermined band of frequencies, thereby removing any harmonic distortion in the UWB radar signal on a pulse by pulse basis. This fast time band pass filter 804 may substantially perform the same functions and replace the dual operations performed on the analog UWB radar signal by the band pass filters 624, 630 of FIG. 6 and the matched filter 702 of FIG. 7 performed in the analog domain. Thus, the two functions previously described in connection with the band pass filter(s) 624, 630 of FIG. 6 and the matched filter 702 of FIG. 7 can be achieved in a single step by the fast time band pass filtering of the digital signal at the fast time band pass filter 804 in the digital domain.

The output of the fast time band pass filter 804 is input to a slow time high pass filter 806, which may have substantially the same function as the slow time high pass filter 706 previously described in connection with FIG. 7. However, since the slow time high pass filter 806 is disposed after the fast time band pass filter 804 and before demodulation (e.g., down-conversion of the UWB radar signal to baseband), higher receiver sensitivity may be achieved by removing undesired harmonic content below the high pass frequency that is common to a plurality of consecutively received radar signals. Thus, the output of the slow time high pass filter 806 may be provided to a digital I/Q demodulator 808, which may down-convert the digital UWB signal to a complex baseband signal comprising an in-phase (I) component and a quadrature (Q) component, rather than only a real baseband signal comprising only the I component or only the magnitude of a vector represented by the I and Q components. The complex baseband signal may be provided to a fast time low pass filter 810, which removes or substantially attenuates any harmonics of the original signal content caused by the down-conversion of the I/Q demodulator 808 on a pulse by pulse basis. The output of the fast time low pass filter 810 may be input to a propagation loss compensation processor 812, which may have the net effect of increasing any amplitude of the signal that has been attenuated due to propagation of the UWB radar signal from transmitter to receiver. The output of the propagation loss compensation processor 812 may be subjected to windowing at block 814 and then to Doppler processing at the Doppler processor 816. The Doppler processing at Doppler processor 816 may have substantially the same effect as the Doppler processing of the Doppler processor 708, with the exception that now, based at least in part on the utilization of complex demodulation, a range, a speed, and a moving direction of an object may be determined. The output of the Doppler processor 816 may be provided to a target detector 818, which may process the output of the Doppler processor 816 and trigger a positive detection of an object based at least in part on comparisons with and/or satisfaction of predetermined criteria.

The digital processing described in connection with FIG. 8 may be performed by either or both of the processor 408 or the processor 506 previously described in connection with FIGS. 4 and 5 and has at least the following three advantages over the processing described in connection with FIG. 7. First, the band pass filtering of FIG. 6 and matching filtering of FIG. 7 may be combined into a single operation, reducing the time and resources required for these operations. Second, detection sensitivity is increased by performing the high pass filtering after the fast time band pass filtering. And third, using digital down conversion to convert the UWB radar signal to a complex baseband signal enables all of the range, the speed, and the direction of a detected object to be determined.

Figure 9:
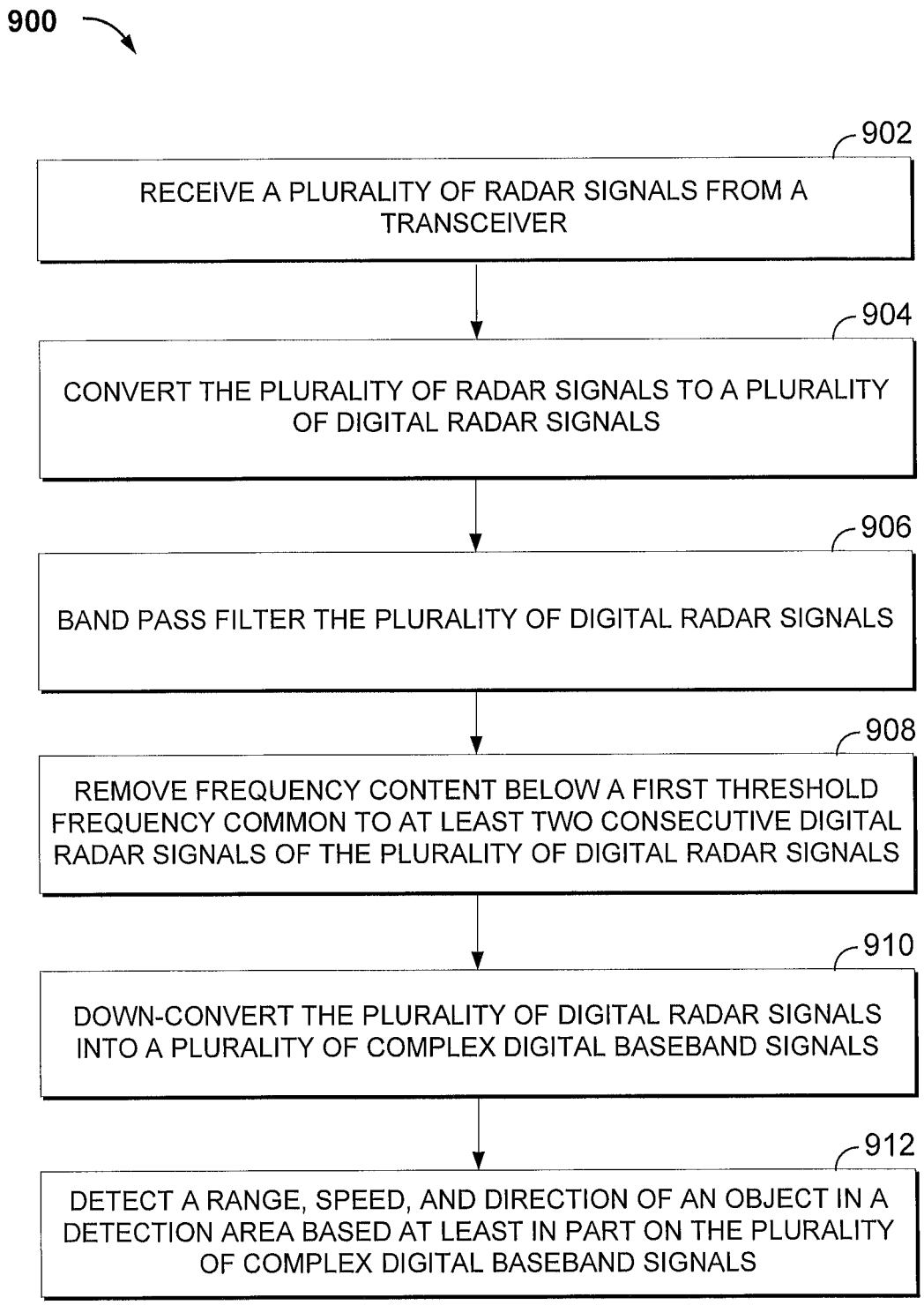
FIG. 9 is a flowchart depicting a method for detecting objects in a detection area near a wireless power transfer system, in accordance with some implementations.

FIG. 9 is a flowchart 900 depicting a method for detecting an object in a detection area near a wireless power transfer system, in accordance with some implementations. The method of flowchart 900 is described herein with reference to the processor 408, the processor 506, and the plurality of radar transceivers 406a-406f as previously described in connection with FIGS. 4-5. Although the method of flowchart 900 is described herein with reference to a particular order, in various implementations, blocks herein may be performed in a different order, or omitted, and additional blocks may be added.

The flowchart 900 may start with block 902, which includes receiving a plurality of radar signals from a radar transceiver. For example, the receiver 504 of any of the plurality of radar transceivers 406a-406f may be configured to receive a plurality of radar signals previously transmitted from any of the plurality of radar transceivers 406a-406f, as previously described in connection with FIG. 4-5. In some implementations, the receiver 504 of any of the plurality of radar transceivers 406a-406f may also be known as, or comprise at least a portion of "means for receiving a plurality of radar signals from a radar transceiver."

The flowchart 900 may then advance to block 904, which includes converting the plurality of radar signals to a plurality of digital radar signals. For example, the processor 408 (see FIG. 4) and/or the processor 506 (see FIG. 5) may be configured to convert the plurality of radar signals to a plurality of digital radar signals by operating as, for example, an analog-to-digital converter. In such implementations, the processor 408 and/or the processor 506 may also be known as, or comprise at least a portion of "means for converting the plurality of radar signals to a plurality of digital radar signals."

In some implementations, the processor 408 and/or the processor 506 may also be configured to remove a DC component from the plurality of digital radar signals. In such implementations, the processor 408 and/or the processor 506 may also be known as, or comprise at least a portion of "means for removing a DC component from the plurality of digital radar signals."

The flowchart 900 may then advance to block 906, which includes band pass filtering the plurality of digital radar signals. For example, the processor 408 and/or the processor 506 may be configured to band pass filter the plurality of digital radar signals. This may have the net effect of passing only components of the digital UWB signal that are within a predetermined band of frequencies, thereby removing any harmonic distortion in the UWB radar signal on a pulse by pulse basis. This fast time band pass filter 804 may substantially perform the same functions and replace the dual operations performed on the analog UWB radar signal by the band pass filter(s) 624, 630 of FIG. 6 and the matched filter 702 of FIG. 7. Thus, the two functions previously described in connection with the band pass filter 624, 630 of FIG. 6 and the matched filter 702 of FIG. 7 can be achieved in a single step and at the UWB frequency. In such implementations, by band pass filtering the plurality of digital radar signals before down-converting the plurality of digital radar signals, the plurality of digital radar signals are amplified, an amount of noise in the plurality of digital radar signals is reduced, and frequency components of the plurality of digital radar signals above a second threshold frequency are removed. Specifically, by band pass filtering the plurality of digital radar signals before down-converting the plurality of digital radar signals, the processor 408, 506 amplifies the plurality of digital radar signals, reduces an amount of noise in the plurality of digital radar signals and removes frequency components of the plurality of digital radar signals above a second threshold frequency. In such implementations, the processor 408 and/or the processor 506 may also be known as, or may comprise at least a portion of "means for band pass filtering the plurality of digital radar signals."

The flowchart 900 may then advance to block 908, which includes removing frequency content below a first threshold frequency common to at least two consecutive digital radar signals of the plurality of digital radar signals. For example, the processor 408 or the processor 506 may be configured to remove frequency content below a first threshold frequency common to at least two consecutive digital radar signals of the plurality of digital radar signals. This filtering can have the net effect of ensuring that only fast-changing signals likely to be caused by living or moving objects remain after filtering, eliminating slow moving aberrations in the signal likely to have other causes such as but not limited to aging or heating of electrical components in the detection system. In such implementations, the processor 408 and/or the processor 506 may also be known as or comprise at least a portion of "means for removing frequency content below a first threshold frequency common to at least two consecutive digital radar signals of the plurality of digital radar signals."

In some implementations, the processor 408 and/or the processor 506 may be configured to remove the frequency content below the first threshold frequency common to the at least two consecutive digital radar signals of the plurality of digital radar signals before down-converting the plurality of digital radar signals The flowchart 900 may then advance to block 910, which includes down-converting the plurality of digital radar signals into a plurality of complex digital baseband signals. Each of the plurality of complex digital baseband signals may comprise an in-phase component and a quadrature-phase component. For example, the processor 408 and/or the processor 506 may be configured to down-convert the plurality of digital radar signals into a plurality of complex digital baseband signals. In such implementations, the processor 408 and/or the processor 506 may operate as an I/Q demodulator. In such implementations, the processor 408 and/or the processor 506 may also be known as, or may comprise at least a portion of "means for down-converting the plurality of digital radar signals into a plurality of complex digital baseband signals."

In some implementations, the processor 408 and/or the processor 506 is further configured to remove frequency content above a second frequency threshold from the plurality of complex digital baseband signals after down-conversion in a low pass filter operation. In such implementations, the processor 408 and/or the processor 506 may also be known as, or may comprise at least a portion of "means for removing frequency content above a second frequency threshold from the plurality of complex digital baseband signals."

The flowchart 900 may then advance to block 912, which includes detecting a range, a speed, and a direction of an object in a detection area based at least in part on the plurality of complex digital baseband signals. For example, as previously described, the processor 408 of FIG. 4 and/or the processor 506 of FIG. 5 may be configured to detect a range, a speed, and direction of the object in the detection area based at least in part on the plurality of complex digital baseband signals. Thus, in some implementations, the processor 408 and/or the processor 506 may also be known as, or comprise at least a portion of "means for detecting a range, a speed, and a direction of the object in the detection area based at least in part on the plurality of complex digital baseband signals."

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for receiving a radar signal from a radar transceiver may comprise any of the receivers 504 in any of the radar transceivers 406a-406f. Means for band pass filtering the received radar signal may comprise one or both of the processor 408 and/or the processor 506. Means for down-converting the band pass filtered received signal into a complex baseband signal may comprise one or both of the processor 408 and/or the processor 506. Means for detecting a range, speed, and direction of an object in the detection area based at least in part on the complex baseband signal may comprise one or both of the processor 408 and/or the processor 506. Means for sensing a Doppler shift present in the received radar signal may comprise one or both of the processor 408 and/or the processor 506.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the present application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features have been described herein. It is to be understood that not necessarily all such advantages may be achieved in accordance with any particular implementation. Thus, one or more implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the present application. Thus, the present application is not intended to be limited to the implementations shown herein but is to be accorded the widest scope consistent with the principles and novel features disclosed herein.

What is claimed is:

1. An apparatus for detecting an object in a detection area of a wireless power transfer system, the apparatus comprising:
a receiver configured to receive a plurality of radar signals from a radar transceiver;
a processor configured to:
convert the plurality of radar signals to a plurality of digital radar signals,
generate a first plurality of filtered radar signals based on removing first frequency content outside a first frequency band from the plurality of digital radar signals,
generate a second plurality of filtered radar signals based on removing second frequency content below a first threshold frequency from the first plurality of filtered radar signals, wherein removing the second frequency content includes passing through those signals caused by living or moving objects,
down-convert the second plurality of filtered radar signals into a plurality of complex digital baseband signals, and
detect a presence of the object in the detection area based at least in part on the plurality of complex digital baseband signals.

2. The apparatus of claim 1, wherein each of the plurality of complex digital baseband signals comprises an in-phase component and a quadrature-phase component.

3. The apparatus of claim 1, wherein the processor is configured to remove the frequency content below the first threshold frequency before down-converting the second plurality of filtered radar signals.

4. The apparatus of claim 1, wherein the processor is further configured to remove frequency content above a second frequency threshold from the plurality of complex digital baseband signals.

5. The apparatus of claim 1, wherein the processor is further configured to remove a DC component from the plurality of digital radar signals.

6. The apparatus of claim 1, wherein the removal of digital radar signals from the plurality of digital radar signals occurs before the down-conversion of the plurality of digital radar signals and wherein the processor is further configured to amplify the plurality of digital radar signals, reduce an amount of noise in the plurality of digital radar signals and remove frequency components of the plurality of digital radar signals above a second threshold frequency.

7. The apparatus of claim 1, wherein the processor configured to detect the presence of the object in the detection area comprises the processor configured to detect a range, a speed, and a direction of the object in the detection area based at least in part on the plurality of complex digital baseband signals at least partly by sensing a Doppler shift present in the plurality of complex digital baseband signals.

8. A method for detecting an object in a detection area of a wireless power transfer system, the method comprising:
receiving a plurality of radar signals from a radar transceiver;
converting the plurality of radar signals to a plurality of digital radar signals;
generating a first plurality of filtered radar signals based on removing first frequency content outside a first frequency band from the plurality of digital radar signals;
generating a second plurality of filtered radar signals based on removing second frequency content below a first threshold frequency from the first plurality of filtered radar signals, wherein removing the second frequency content includes passing through those signals caused by living or moving objects;
down-converting the second plurality of filtered radar signals into a plurality of complex digital baseband signals; and
detecting a presence of the object in the detection area based at least in part on the plurality of complex digital baseband signals.

9. The method of claim 8, wherein each of the plurality of complex digital baseband signals comprises an in-phase component and a quadrature-phase component.

10. The method of claim 8, further comprising removing the frequency content below the first threshold frequency before down-converting the second plurality of filtered radar signals.

11. The method of claim 8, further comprising removing frequency content above a second frequency threshold from the plurality of complex digital baseband signals.

12. The method of claim 8, further comprising removing a DC component from the plurality of digital radar signals.

13. The method of claim 8, wherein the removal of digital radar signals from the plurality of digital radar signals occurs before the down-conversion of the plurality of digital radar signals and further comprising amplifying the plurality of digital radar signals, reducing an amount of noise in the plurality of digital radar signals, and removing frequency components of the plurality of digital radar signals above a second threshold frequency.

14. The method of claim 8, wherein the detecting the presence of the object in the detection area comprises detecting a range, a speed, and a direction of the object in the detection area based at least in part on the plurality of complex digital baseband signals comprises sensing a Doppler shift present in the plurality of complex digital baseband signals.

15. A non-transitory, computer-readable medium comprising code that, when executed, causes an apparatus for detecting an object in a detection area of a wireless power transfer system to:
receive a plurality of radar signals from a radar transceiver;
convert the plurality of radar signals to a plurality of digital radar signals;
generate a first plurality of filtered radar signals based on removing first frequency content outside a first frequency band from the plurality of digital radar signals;
generate a second plurality of filtered radar signals based on removing second frequency content below a first threshold frequency from the first plurality of filtered radar signals, wherein removing the second frequency content includes passing through those signals caused by living or moving objects;
down-convert the second plurality of filtered radar signals into a plurality of complex digital baseband signals; and
detect a presence of the object in the detection area based at least in part on the plurality of complex digital baseband signals.

16. The medium of claim 15, wherein each of the plurality of complex digital baseband signals comprises an in-phase component and a quadrature-phase component.

17. The medium of claim 15, wherein the code, when executed, causes the apparatus to remove the frequency content below the first threshold frequency before down-converting the second plurality of filtered radar signals.

18. The medium of claim 15, wherein the code, when executed, causes the apparatus to remove frequency content above a second frequency threshold from the plurality of complex digital baseband signals.

19. The medium of claim 15, wherein the code, when executed, causes the apparatus to remove a DC component from the plurality of digital radar signals.

20. The medium of claim 15, wherein the removal of digital radar signals from the plurality of digital radar signals occurs before the down-conversion of the plurality of digital radar signals and wherein the code, when executed, is further configured to cause the apparatus to amplify the plurality of digital radar signals, reduce an amount of noise in the plurality of digital radar signals, and remove frequency components of the plurality of digital radar signals above a second threshold frequency.

21. The medium of claim 15, wherein the code that, when executed, causes the apparatus to detect the presence of the object in the detection area further causes the apparatus to detect a range, a speed, and a direction of the object in the detection area based at least in part on the plurality of complex digital baseband signals at least partly by sensing a Doppler shift present in the plurality of complex digital baseband signals.

22. An apparatus for detecting an object in a detection area of a wireless power transfer system, the apparatus comprising:
means for receiving a plurality of radar signals from a radar transceiver;
means for converting the plurality of radar signals to a plurality of digital radar signals;
generate a first plurality of filtered radar signals based on removing first frequency content outside a first frequency band from the plurality of digital radar signals;
means for generating a second plurality of filtered radar signals based on removing second frequency content below a first threshold frequency from the first plurality of filtered radar signals, wherein remaining frequency content includes those signals caused by living or moving objects and wherein the first threshold frequency distinguishes between living or moving objects and other objects;
means for down-converting the plurality of filtered radar signals into a plurality of complex digital baseband signals; and
means for detecting a presence of the object in the detection area based at least in part on the plurality of complex digital baseband signals.

23. The apparatus of claim 22, wherein each of the plurality of complex digital baseband signals comprises an in-phase component and a quadrature-phase component.

24. The apparatus of claim 22, wherein the means for removing the frequency content below the first threshold frequency operates before the means for down-converting the plurality of digital radar signals.

25. The apparatus of claim 22, further comprising means for removing frequency content above a second frequency threshold from the plurality of complex digital baseband signals.

26. The apparatus of claim 22, further comprising means for removing a DC component from the plurality of digital radar signals.

27. The apparatus of claim 22, wherein the removal of digital radar signals from the plurality of digital radar signals occurs before the down-conversion of the plurality of digital radar signals and wherein the apparatus further comprises means for amplifying the plurality of digital radar signals, means for reducing an amount of noise in the plurality of digital radar signals, and means for removing frequency components of the plurality of digital radar signals above a second threshold frequency.

28. The apparatus of claim 22, wherein the means for detecting the presence of the object in the detection area comprises means for detecting a range, a speed, and a direction of the object based at least in part on the plurality of complex digital baseband signals senses a Doppler shift present in the plurality of complex digital baseband signals.

* * * * *